(12) United States Patent
Leach

(10) Patent No.: US 7,884,306 B2
(45) Date of Patent: Feb. 8, 2011

(54) OVEN AND A FOOD DELIVERY VEHICLE COMPRISING SAID OVEN

(75) Inventor: Kevan Graham Leach, Chippenham (GB)

(73) Assignee: Hotpods Limited, Cheshire (GB)

( * ) Notice: Subject to any disclaimer, the term of this patent is extended or adjusted under 35 U.S.C. 154(b) by 797 days.

(21) Appl. No.: 10/568,524

(22) PCT Filed: Aug. 16, 2004

(86) PCT No.: PCT/GB2004/003556

§ 371 (c)(1),
(2), (4) Date: Oct. 3, 2007

(87) PCT Pub. No.: WO2005/017412

PCT Pub. Date: Feb. 24, 2005

(65) Prior Publication Data

US 2008/0023459 A1    Jan. 31, 2008

(30) Foreign Application Priority Data

Aug. 15, 2003 (GB) .................................. 0319241.6

(51) Int. Cl.
  *B60L 1/02* (2006.01)
  *A21B 1/00* (2006.01)
(52) U.S. Cl. ........................ 219/202; 219/394; 219/386; 219/399; 219/400; 99/476; 99/339; 99/446; 99/340; 99/483; 99/357; 99/427; 126/19.5; 126/21 A; 426/523
(58) Field of Classification Search ................ 219/202, 219/394, 386, 399, 400; 99/476, 339, 446, 99/340, 483, 357, 427; 126/19.5, 21 A, 21 R; 426/523
See application file for complete search history.

(56) References Cited

U.S. PATENT DOCUMENTS

| 3,521,030 A | 7/1970 | Maahs |
| 4,317,025 A | 2/1982 | Starnes |
| 4,919,477 A | 4/1990 | Bingham et al. |
| 5,505,122 A | 4/1996 | Gerrit |
| 6,431,628 B1 * | 8/2002 | Bell, Jr. .................. 296/24.32 |
| 2002/0190133 A1 | 12/2002 | Dedio |
| 2003/0033825 A1 | 2/2003 | Goosman |
| 2003/0052499 A1 * | 3/2003 | Delzanno et al. .............. 296/22 |
| 2003/0106889 A1 | 6/2003 | Owens et al. |

FOREIGN PATENT DOCUMENTS

| DE | 94 11 346.7 | 1/1995 |
| DE | 19 720 809 | 11/1998 |
| DE | 19 961 977 | 7/2001 |
| EP | 0 481 352 A1 | 4/1992 |

(Continued)

*Primary Examiner*—Shawntina Fuqua
(74) *Attorney, Agent, or Firm*—Merchant & Gould P.C.

(57) ABSTRACT

A convection oven for use in a food delivery vehicle comprises an oven cavity with an air inlet and an air outlet, an air feed conduit for feeding an air feed into the oven cavity through the air inlet and a heating arrangement for heating the air feed before it is fed into the oven cavity, the heating arrangement comprising a heating device that is electrically powered and being arranged to maintain a temperature of at least 130° C. in the oven cavity. A food delivery vehicle may comprise such an oven and the oven may be heatable from an electric current provided by the engine of the vehicle.

17 Claims, 2 Drawing Sheets

FOREIGN PATENT DOCUMENTS

| | | |
|---|---|---|
| EP | 0 628 277 A1 | 12/1994 |
| FR | 2 629 183 | 9/1989 |
| FR | 2 693 616 | 4/1994 |
| FR | 2 697 407 | 5/1994 |
| WO | 92/16137 | 10/1992 |

* cited by examiner

OVEN AND A FOOD DELIVERY VEHICLE COMPRISING SAID OVEN

The invention relates to ovens and especially to mobile ovens, in particular to ovens arranged on vehicles.

It is well-known to provide ovens on certain kinds of vehicle, for example on camper vans which are to be used as mobile homes, and on vehicles of a kind used for home delivery of hot, cooked meals especially to the elderly and/or infirm. The known ovens are in general heated by means of a gas supply from a cylinder of compressed gas which is carried on the vehicle. The need for a gas supply on the vehicle represents a fire and explosion hazard for example, if the vehicle is involved in an accident or if the gas cylinder otherwise accidentally is damaged or becomes ignited. Also, it is inconvenient that the gas cylinder must periodically be replaced and that it sometimes occupies a relatively large amount of space on the vehicle. It is also inconvenient that, in some jurisdictions, it is a legal requirement that a gas cylinder be stored in a separate service space which must be ventilated to the outside atmosphere.

It is also known to provide electrically heated ovens on a vehicle, but such ovens are typically insufficiently powered to attain the temperatures necessary for fully cooking food. Generally, such ovens derive power from the vehicle at the vehicle's supply voltage, and the power available is consequently only a few watts. That necessarily means that the oven must be small in volume, can therefore hold only a small amount of food, and will take a relatively long time to heat food. That may be adequate in, for example, a recreational vehicle such as a camper van, but has obvious practical limitations when a large number of meals need to be provided, where the journey times are short, and where there are multiple stops for delivery.

There is a need for a mobile oven which is safe, can heat food efficiently to temperatures which are appropriate (in particular, which are considered high enough to achieve effective and acceptable levels of killing of microorganisms) for the cooking of food and/or the regeneration of food from the frozen state, and which can handle a relatively large number of meals.

The invention provides a convection oven for use in a vehicle, having an oven cavity with an air inlet and an air outlet, an air feed conduit for feeding an air feed into the oven through the air inlet and a heating arrangement for heating the air feed before it is fed into the oven cavity, the heating arrangement comprising at least one electrical heating device, and being arranged to maintain a temperature of at least 130° C. within the oven cavity. It has been found that the arrangement of the invention is particularly effective in cooking multiple units of food, such as individual meals, and/or the regeneration thereof from the frozen state in an oven on a vehicle.

The term "convection oven" is used herein to refer to ovens in which heating is effected principally by convection.

Expediently, the air flow through the oven is specifically designed to maximise coverage of the meals in the oven and extract from it the energy available in the heat transfer fluid.

Advantageously, the heating arrangement comprises a first heating device and a second heating device. Preferably the arrangement is such that the air feed is heated by the first and second heating devices in series. That arrangement has been found particularly advantageous in that it has been found that it makes possible particularly effective heating of the multiple units of food, such as individual meals, in an oven on a vehicle. It is believed that is because that preferred arrangement having first and second heating devices in series for heating an air flow can be made to generate relatively high heat flux values within the oven. It is believed that the effectiveness of heating of the individual food units in many previously known delivery vehicles having ovens is hampered by the fact that the packing density of the food units is of necessity high, so that the ratio of occupied volume to void space within the oven is normally high, at least when the vehicle commences its delivery programme. In an oven, effective heating of items within the oven is dependent upon heat flux, which in the case of a convection oven is made up principally of convective heat flux, with any radiative component attributable to radiation from the oven walls and other fittings being small relative to the convective component. Therefore, in the case of a convection oven, the effective heating of items can be regarded as being determined essentially by the heat flux attributable to the convective component, which can be regarded as proportional to the temperature difference between the items to be heated and the local air flow. That difference will of course vary as the items are heated but is a complex function of the convection air flow characteristics and of the characteristics of the items to be heated, for example, volume, surface area and specific heat capacity.

Preferably, the first and second heating devices, when arranged in series, impart to the heat transfer fluid sufficient energy such that a full oven of meals can be regenerated in sufficient time for distribution. Advantageously, the first and second heating devices are arranged to impart energy of at least 30 Kw/m$^3$, more specifically at least 40 Kw/m$^3$ and preferably at least 50 Kw/m$^3$ of operable oven volume. The term "operable oven volume" is used herein to mean the volume of oven that is available to be filled by items to be heated and/or by circulating air.

The oven of the invention is advantageously arranged for regenerating from frozen and/or heating 10 kg or more of food, and preferably at least 10 kg food in individual units of 450 g or less. Advantageously, the oven cavity has an internal volume of not exceeding 0.3 m$^3$, and preferably not exceeding 0.2 m$^3$. Advantageously, the internal volume of the oven cavity is in the range of from 0.05 to 0.15 m$^3$, especially from 0.09 to 0.15 m$^3$.

In an especially preferred oven, the internal volume of the oven cavity is not exceeding 0.15 m$^3$, and the internal volume of the oven cavity is arranged to receive a multiplicity of individual food portions of not exceeding 450 g each. Advantageously, the oven cavity internal volume is adapted to receive at least 10 portions, more preferably from 20 to 60 portions, for example about 30 to 40 portions, of from 300 to 450 g each, especially about 375 g each.

The first and/or the second heating device may be connected to a vehicle motor and can be powered thereby. Preferably, one of said first and second heating devices is powered by the combustion engine of the vehicle and the other is powered by a further combustion device. Advantageously, the first heater is an air to air heater. Preferably, the first heater comprises a combustion device for generating hot combustion gases. The hot combustion gases can then be passed in heat exchange relationship with the air feed. Preferably, the first heating device can be powered by the same fuel as the vehicle, so that the vehicle's usual fuel can be used to power the first heating device.

Advantageously one of said first and second heating devices comprises electrically powered heater elements which are located in the air feed conduit. Those heater elements are powered from a device that is associated with the vehicle engine and which is independent of the vehicle's normal, low-voltage electrical system. That device can generate a relatively high voltage (for example 110V) enabling high power (for example 1 to 7 kW) electrical heater elements to be operated whilst the vehicle engine is running and independently of an external power supply. That way, the vehicle can independently produce a relatively high power to volume ratio thus enabling a sufficient volume of meals to be prepared in an appropriate time.

The invention also provides a vehicle comprising an oven according to the invention. Advantageously, the vehicle comprises an alternator for converting of energy into electrical power for use by at least one of the heating devices, preferably for said second heating device. The vehicle may comprise two ovens, which may optionally each be heated by a common heating arrangement. In the latter case, the common heating arrangement may comprise a hot air feed conduit comprising diverter means for controlling the proportion of the hot air feed conveyed to each oven.

Advantageously, the oven comprises a control device arranged to permit regulation of said first and second heating devices. Advantageously, the oven comprises an adapter means arranged to permit the first and second heating devices to be selectively supplied with mains power when desired. That enables the oven to be operated using mains power when the vehicle is stationary, for example, when food is being prepared at a central distribution depot before the vehicle departs to commence delivery.

The oven is arranged to permit the oven cavity to be held at a temperature which is sufficiently high for food to be defrosted and heated to a suitable serving temperature in an appropriate period of time. Furthermore, the temperature is also preferably such that raw food can be cooked in an appropriate time. In practice, the arrangement will generally be such that the oven cavity can be maintained at a temperature of at least 140° C., advantageously at least 150° C. and preferably at least 180° C. It will be appreciated that the arrangement should be such that the power consumption by the oven does not exceed an amount which can be supplied by the vehicle without detrimentally affecting the vehicle's other functions.

The invention further provides a vehicle having a power source for powering drive means of the vehicle, the vehicle further including an oven for cooking food, heat for heating the oven being generatable at least in part from said power source and the oven being arranged to be maintainable at a temperature of not less than 130° C.

One embodiment of the invention will now be described in detail, by way of example, with reference to the accompanying drawings in which.

Figure 1:
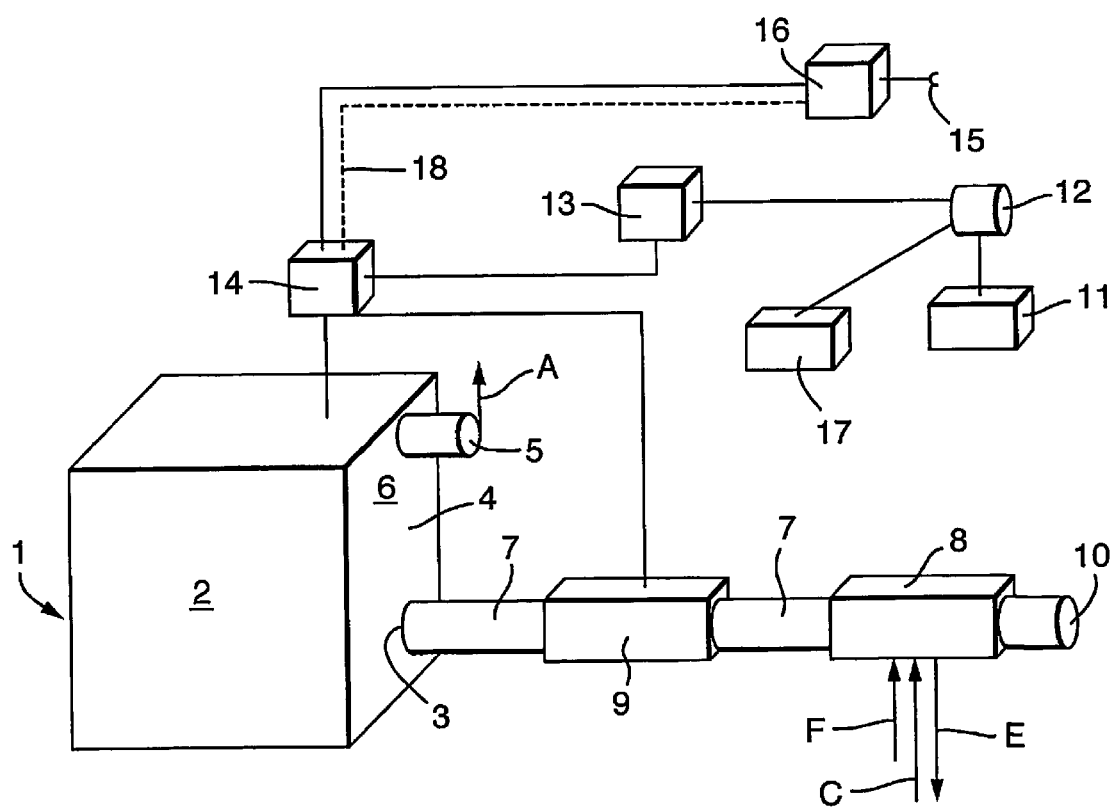
FIG. 1 is a schematic diagram of an oven on a vehicle according to the invention.

Referring to FIG. 1, the oven 1 comprises an oven housing 2 enclosing an oven cavity. Although not shown in the drawing, the oven cavity is adapted to receive a multiplicity (about thirty) of food items on individual plates or trays, the arrangement being such that air is able to circulate convectively along a prescribed path that is designed to encompass all the food in the oven and deliver as much as possible of the energy from the circulated air to the food items between and around the individual plates or trays. The food items are typically frozen, pre-cooked food items, especially individual meals, at a temperature of, for example, −15° C. The oven cavity may, if desired, include a fan for enhancing distribution of air around the contents of the oven and/or an extraction fan arranged to promote/maintain the desired air flow pattern in the oven. If present the extractor fan is preferably arranged to extract air at the same flow rate as the air injected into the oven. An air inlet 3 is provided in a lower region of a rear wall 4 of the housing. It is important for the air inlet 3 to be located in the lower region of the oven wall in order to establish a desired air flow path, according to which the entrant air spreads out across the bottom region of the oven to provide for a full-width flow path up through the oven. An air outlet 5 is provided in an upper region 6 of the wall 4 of the housing. Communicating with the air inlet 3 is an air passageway 7 which is interrupted by a first heater 8 and a second heater 9. The passageway 7 has an air entrance opening 10 through which an air feed can be taken in and defines a continuous path for the air feed through the first and second heaters 8, 9 to the oven inlet 3.

The first heater is a diesel (or petrol) powered air heater, for example of the kind known as AIRTRONIC made by Eberspächer Deutschland, and can heat the air feed to a temperature of about 90 to 110° C. above ambient temperature. The first heater 8 is powered by fuel from the vehicle's tank of diesel fuel, as indicated by arrow F. The first heater 8 also takes in combustion air, as indicated by arrow C, and has a vent for escape of exhaust gas as indicated by arrow E.

The second heating device 9 comprises electric resistance elements mounted in a chamber connected at each end to adjacent portions of the passageway 7. The passageway 7 may comprise a convoluted portion in the region of the resistance elements to prolong the contact time between the air feed and the resistance elements. The second heater 9 is arranged to be powered selectively by an on-vehicle power source or an external power source, for example, mains electricity. The on-vehicle power system is powered from the vehicle engine 11, which feeds electrical power via an alternator 12 (12V/110V) and a regulator 13 to a control device 14 providing a 110V supply centre tapped to earth. Higher voltages may in principle be used but are less desirable for safety reasons. For connection into an external power source for example mains electricity the vehicle comprises a connector 15 and a 240V/110V transformer 16 which carry an electrical current, when the connector 15 is in connection with the external power source, to the control device 14. The control device 14 controls the second heater 9 and also controls certain functions within the oven itself. In principle, the alternator may generate a 12V or 24V voltage for the vehicle's electrical system as well as a higher voltage (e.g. 110V) alternating current for the oven, and in that case there will be a connection between the alternator 12 and the vehicle electrical system 17. In general, however, the vehicle electrical system will be independent and the connection shown in FIG. 1 between alternator 12 and vehicle electrical system 17 will be absent. Reference numeral 18 designates a sensing circuit. It has been found to be particularly effective to use at least one 3 kW heater element as the heating device 9.

Figure 2:
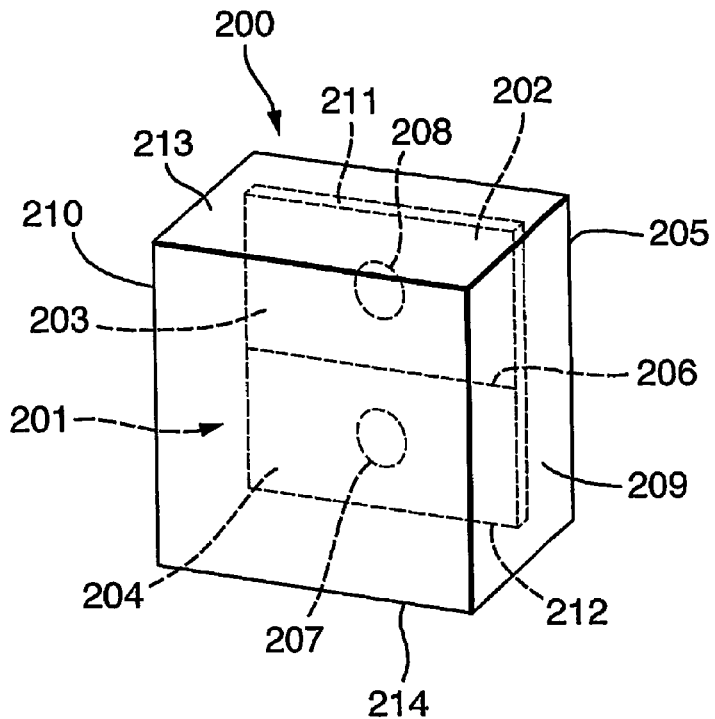
FIG. 2 is a perspective view of an oven from the front.

FIG. 2 shows an oven housing which may differ slightly in structure from that shown in FIG. 1 but operates in the same or similar manner. The oven housing 200 encloses in the embodiment shown a substantially cuboidal oven cavity 201 at the back of which is located a vertically extending baffle 202 having an upper portion 203 and a lower portion 204. The baffle 202 is maintained in spaced relationship with the rear wall 205 of the housing and is connected thereto by a horizontally extending dividing baffle 206. The rear wall 205 includes hot air inlet 207 in the lower region of the wall behind the lower portion 204 of baffle 202, and an air outlet 208 in an upper region of the wall behind the upper portion 203 of baffle 202. The baffle 202 extends fully across the cavity 201, the edges of the baffle abutting the side walls 209, 210. The upper edge 211 and lower edge 212 of the baffle 202 are, in contrast, spaced from the upper wall 213 and lower wall 214 of the housing 200 to define elongate space 217 adjacent to lower wall 214, and elongate space 218 adjacent the upper wall 213. That arrangement permits air to flow around the baffle at the top and bottom of the oven cavity, but not at the sides. Although not shown in the drawings, the lateral extremities of the dividing baffle 206 are curved downwards as that assists in providing a pressure balance in the region behind the baffle 202.

Figure 3:
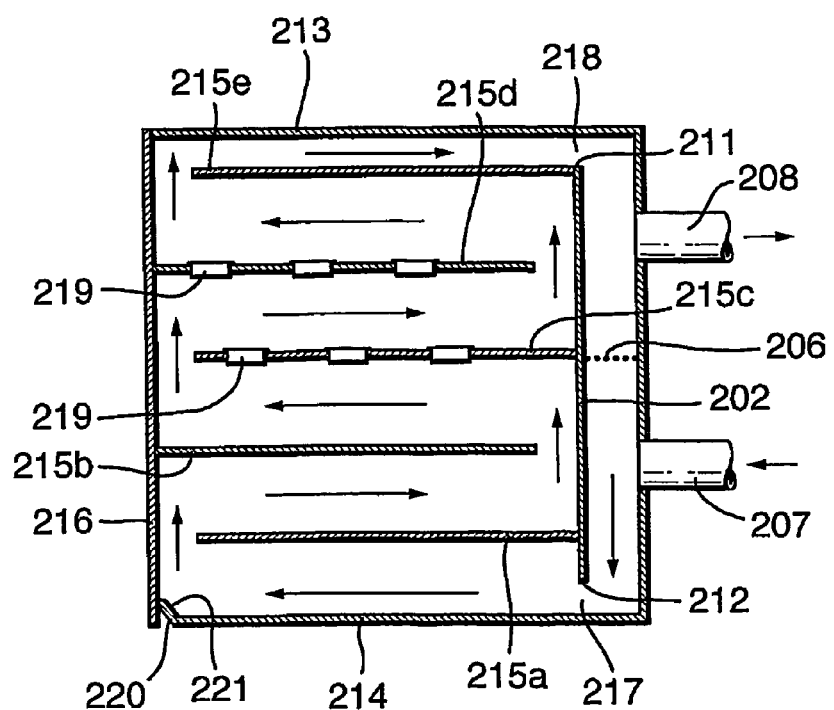
FIG. 3 is a schematic view of the interior of the oven cavity of the oven of FIG. 2 showing the path of air therethrough.

Referring to FIG. 3, the oven cavity is provided with an odd number of trays, there being in the embodiment shown five trays 215a to 215e, which extend fully across the width of the oven cavity between the side walls 209, 210. Each of the trays 215 has an elongate cut-out region along one edge, the edge with that cut-out being located alternately at the front or at the rear of the oven cavity. In that manner, alternate trays 215b, 215d, define an upward flow path for the air between the respective tray and baffle 202 whilst alternate trays 215a, 215c, 215e define an upward flow path for the air between the respective tray and the oven door 216 when the door is closed. That provides a serpentine path, indicated by the arrows, around the successive trays 215a to 215e from the elongate space 217 at the lower extremity of baffle 202 through which the air enters from inlet 207 to the elongate space 218 at the upper extremity of baffle 202 through which the air leaves via outlet 208.

The size of the elongate space 217 between the baffle and the lower wall 214, of the elongate space 218 between the baffle 202 and upper wall 213, and the spacing between baffle 202 and rear wall 205 are selected to promote air pressure and flow conditions which enhance the transfer of energy from the circulated air into food items 219 carried in the trays 215a to 215e. A lip 220 having on its inner face an upwardly inclined surface 221 is provided at the front edge of the lower wall 214 for upwardly deflecting the air flow impinging thereon.

It will be appreciated that the temperature of the air will tend to decrease as energy is extracted therefrom along its path. Nonetheless, using the arrangement described even the food items in the top tray can be heated to temperatures in excess of 130° C.

The heating arrangement described above with reference to FIG. 1 is expediently used to heat air upstream of the inlet 207.

The oven cavity typically has the following dimensions:

| | |
|---|---|
| Volume of oven cavity (excluding region behind baffle 202): | From 0.06 to 0.21 m³ |
| Width of oven: | From 350 to 500 mm |
| Height of oven | From 450 to 600 mm |
| Depth of oven | From 400 to 600 mm |
| Height of elongate space 217: | From 20 to 50 mm, preferably 35 to 40 mm |
| Height of elongate space 218: | From 25 to 50 mm, preferably 45 to 50 mm |
| Spacing between baffle 202 and rear wall 205: | From 20 to 60 mm, preferably 45 to 50 mm |

Whilst those dimensions are indicated above specifically with reference to the oven of FIGS. 2 and 3, they are also typical of ovens according to the invention that are not in accordance with FIGS. 2 and 3.

In use of the oven system, the oven may be heated, whilst the vehicle is travelling or during short stops, by means of the diesel powered heater 8, and the second heater 9 powered from the vehicle engine. The oven may if desired be preheated to a temperature of, for example, 160° C. or more before placing the food therein.

If the vehicle is stationary for any length of time, for example, before commencement of a delivery journey, the control device may be if desired used to switch the power supply from the vehicle engine to mains power, the connector being used to connect to a convenient external mains power source. It will be appreciated that connection to an external source is unnecessary for adequately heating the food but represents a more environmentally friendly way of doing so.

In the arrangement shown, the oven cavity preferably has a volume of about 0.11 m³ and the described heating arrangement is able to generate and maintain an oven temperature of more than 130° C. when the oven is filled with 30 individual meals of 375 g each.

Although not shown in the drawing, it is as already mentioned advantageous for the vehicle to be fitted with two ovens, which may conveniently be in the form of a pair of cavities formed in a single body and each having a respective access door and heating and control arrangement. That allows for two different types of food item, having different heating requirements, to be carried, or for one oven to be reduced in temperature once the items contained therein are fully cooked, thereby avoiding overcooking of those items. That may allow for greater flexibility in the range of food items to be carried and/or in the length of the delivery round.

Whilst the oven may be used to regenerate frozen, precooked meals as mentioned above, it may instead be used to cook raw food. It may also, if desired, be used merely to maintain heated meals at a suitable serving temperature, and in that case it may be possible to maintain the desired temperature without switching on the second heater.

If desired other devices, for example, a refrigerator, a freezer or a source of water may additionally be present. The water may be potable or non-potable (and thus suitable for washing only). A heater may be provided for heating the water.

The invention claimed is:

1. A convection oven for use in a vehicle, the oven comprising:
an oven chamber with an air inlet and an air outlet,
an air feed conduit feeding an air feed into the oven chamber through the air inlet; and
a heating arrangement heating the air feed before it is fed into the oven chamber, the heating arrangement being arranged to maintain a temperature of at least 130° C. in the oven chamber;
an electrically powered first heating device in the air feed conduit; and
a second heating device in the air feed conduit spaced apart from the first heating device;
wherein in use the first and second heating devices heat the air feed in series.

2. An oven according to claim 1, wherein the first heating device and/or the second heating device can be connected to a vehicle motor and can be powered by the motor vehicle.

3. An oven according to claim 1, wherein the first and second heating devices can be powered by power means present on a vehicle motor.

4. An oven according to claim 1, wherein at least one of the first and second heating devices comprises a combustion device for generating hot combustion gases which can be used to heat the air feed.

5. An oven according to claim 4, further comprising heat exchange means for passing the hot combustion gases in heat exchange relationship with the air feed.

6. An oven according to claim 1, further comprising a control device arranged to permit regulation of said first and second heating devices to obtain a desired temperature within the oven chamber.

7. An oven according to claim 1, further comprising adapter means arranged to permit at least a part of the heating arrangement to be selectively supplied with power from an external source when desired.

8. An oven according to claim 1, wherein the arrangement is such that the oven chamber can be maintained at a temperature of at least 150° C.

9. An oven according to claim 1, wherein the volume of the oven chamber is not more than 0.15 m$^3$.

10. An oven according to claim 1, wherein the heating arrangement can generate a temperature of at least 130° C. when the oven contains 10 kg of food in individual portions of about 400 g.

11. A vehicle comprising a convection oven for use in the vehicle, the oven comprising:

an oven chamber with an air inlet and an air outlet, an air feed conduit feeding an air feed into the oven chamber through the air inlet; and a heating arrangement heating the air feed before it is fed into the oven chamber, the heating arrangement being arranged to maintain a temperature of at least 130° C. in the oven chamber;

an electrically powered first heating device in the air feed conduit; and a second heating device in the air feed conduit spaced apart from the first heating device;

wherein the first and second heating devices heat the air feed in series.

12. A vehicle according to claim 11, wherein the vehicle is powered by an internal combustion engine.

13. A vehicle according to claim 11, comprising a combustible fuel.

14. A vehicle according to claim 12, wherein the vehicle has an internal combustion engine and the oven is heatable in part from an electrical current derived from said engine.

15. A vehicle according to claim 11, comprising two ovens.

16. A vehicle according to claim 15, wherein each oven comprises a respective heating and control arrangement.

17. A vehicle according to claim 15, wherein the ovens are heated by a common heating arrangement.

* * * * *